(12) United States Patent
Kelkar

(10) Patent No.: US 7,194,254 B2
(45) Date of Patent: Mar. 20, 2007

(54) APPARATUS FOR RESTRICTED BROWSER ACCESS WITHIN A WIRELESS COMMUNICATION DEVICE AND METHOD THEREFOR

(75) Inventor: Uday Kelkar, Grayslake, IL (US)

(73) Assignee: Motorola Inc., Schaumburg, IL (US)

( * ) Notice: Subject to any disclaimer, the term of this patent is extended or adjusted under 35 U.S.C. 154(b) by 406 days.

(21) Appl. No.: 10/331,849

(22) Filed: Dec. 30, 2002

(65) Prior Publication Data
US 2004/0198456 A1 Oct. 7, 2004

(51) Int. Cl.
*H04M 3/42* (2006.01)
*H04Q 7/22* (2006.01)
*H04Q 7/38* (2006.01)

(52) U.S. Cl. .............. 455/414.1; 455/426.1; 455/456.3

(58) Field of Classification Search ............. 455/414.1, 455/426.1, 550.1, 554.2, 557, 558, 556.1
See application file for complete search history.

(56) References Cited

U.S. PATENT DOCUMENTS

| | | | | |
|---|---|---|---|---|
| 6,061,346 A | * | 5/2000 | Nordman | 370/352 |
| 6,169,897 B1 | * | 1/2001 | Kariya | 455/456.3 |
| 6,341,228 B1 | * | 1/2002 | Hubbe et al. | 455/566 |
| 6,480,852 B1 | * | 11/2002 | Himmel et al. | 707/10 |
| 6,564,047 B1 | * | 5/2003 | Steele et al. | 455/405 |
| 6,671,522 B1 | * | 12/2003 | Beaudou | 455/558 |
| 2003/0016382 A1 | * | 1/2003 | Schneider et al. | 358/1.15 |
| 2003/0041109 A1 | * | 2/2003 | Meloni et al. | 709/205 |
| 2003/0112271 A1 | * | 6/2003 | Batalden et al. | 345/744 |
| 2004/0177276 A1 | * | 9/2004 | MacKinnon et al. | 713/201 |
| 2005/0144049 A1 | * | 6/2005 | Kuzunuki et al. | 705/6 |
| 2006/0031532 A1 | * | 2/2006 | Sanders | 709/227 |

FOREIGN PATENT DOCUMENTS

KR 10-2002-0027702 A 4/2002
KR 10-2002-0082480 A 7/2002

* cited by examiner

*Primary Examiner*—Temica Beamer
*Assistant Examiner*—Joy Contee
(74) *Attorney, Agent, or Firm*—Randi L. Karpinia; Sylvia Chen

(57) ABSTRACT

A wireless communication device (10) includes an external memory interconnect (50) for operatively connecting to a memory storage device (105), a processor (40), and a browser application (70). The processor (40) is programmed to retrieve a restricted URL list file (140) from the memory storage device (105) via the external memory interconnect (50). The browser application (70) is programmed to compare a desired URL to the restricted URL list file (140), and restrict access to the desired URL when the desired URL is contained within the restricted URL list file (140).

14 Claims, 2 Drawing Sheets

APPARATUS FOR RESTRICTED BROWSER ACCESS WITHIN A WIRELESS COMMUNICATION DEVICE AND METHOD THEREFOR

BACKGROUND OF THE INVENTION

1. Field of the Invention

This invention relates in general to wireless communication devices and more particularly to wireless communication devices having Internet browser capability.

2. Description of the Related Art

Historically, wireless communication devices, such as cellular telephones and two way messaging devices, have had the ability to receive data and/or voice messages sent from a wireless communication system, and perform standard functions in response to message receipt such as storing the message, displaying the message, or alerting the user of receipt of the message. Data messages are typically a numeric message such as a phone number, or an alphanumeric message containing one unique piece of information such as "meeting in my office at 6:00 pm."

The user is alerted of receipt of a new message by an audible alert or a vibratory alert. The display of many wireless communication devices today includes a message indicator for each message it has received and stored in memory. This message indicator allows a quick view for the user of how many messages are in the wireless communication device and also allows the user to quickly pick a message to view. The display further can include a call receipt message indicating to the user a new call is being received and/or the source of the new call.

Today, methods and systems have been developed in an attempt to satisfy the increasing demand for information, multimedia and other communication services on wireless communication devices. One of the most popular techniques of obtaining these services is through the Internet. The Internet is collection of over 25,000 computer networks connected through a communication backbone (NSFNET backbone) funded by the National Science Foundation (NSF) and is currently managed by Advanced Network System (ANS). A subscriber obtains an account with an organization's host computer (server) that is connected to the Internet through one or more networks. Traditionally, the subscriber is connected to the server through telephone lines using a personal computer (PC) and a modem. As use of the Internet becomes more popular, different methods of accessing the Internet have been developed. For example, users can access the Internet using a wireless communication device.

Internet enabled wireless devices such as cellular telephones and two way messaging devices, for example, can include a browser application with the same functionality as a browser application traditionally installed within a fixed device such as a personal computer. One key concern to both the network service providers and the individual subscribers is restriction of access to unauthorized or unacceptable Internet websites. It is further desirable to provide such restriction using a customizable, flexible, system, which does not limit transportability among the various wireless communication devices.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF THE PREFERRED EMBODIMENT(S)

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but rather should be interpreted merely as a basis for the claims and as a representative basis for teaching one skilled in the art to variously employ the present invention in virtually any appropriately detailed structure. Further, the terms and phrases used herein are not intended to be limiting; but rather are intended to provide an understandable description of the invention.

The terms "a" or "an," as used herein, are defined as one or more than one. The term "plurality," as used herein, is defined as two or more. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The terms "program," "software application," and the like, as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Figure 1:
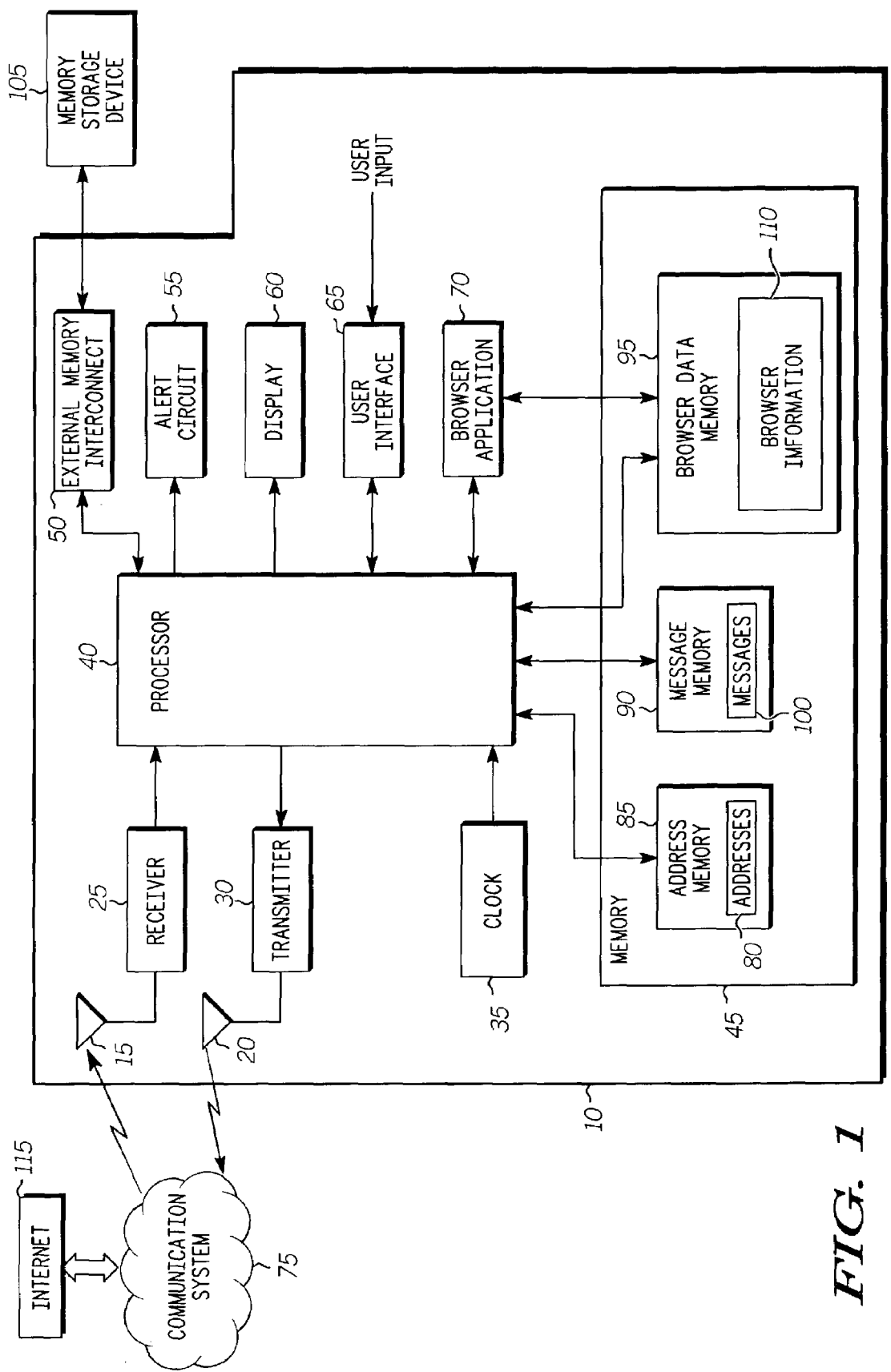
FIG. 1 is an electronic block diagram of a wireless communication device in accordance with a preferred embodiment of the present invention.

FIG. 1 is an electronic block diagram of a wireless communication device 10 in accordance with a preferred embodiment of the present invention. It will be appreciated by one of ordinary skill in the art that the wireless communication device in accordance with the present invention, can be a mobile cellular telephone, a mobile radio data terminal, a mobile cellular telephone having an attached data terminal, or a two way messaging device. In the following description, the term "wireless communication device" refers to any of the devices mentioned above or an equivalent.

As illustrated in FIG. 1, the wireless communication device 10 includes a first antenna 15, a second antenna 20, a receiver 25, a transmitter 30, a clock 35, a processor 40, a memory 45, a memory interconnect 50, an alert circuit 55, a display 60, a user interface 65 and a browser application 70.

The first antenna 15 intercepts transmitted signals from a communication system 75. It will be appreciated by one of ordinary skill in the art that the communication system 75, in accordance with the present invention, can function utilizing any wireless radio frequency (RF) channel, for example, a two-way messaging channel, a mobile cellular telephone channel, or a mobile radio channel. Similarly, it will be appreciated by one of ordinary skill in the art that the communication system 75 can function utilizing other types of wireless communication channels such as infrared channels and/or Bluetooth channels. Further, it will be appreciated by one of ordinary skill in the art that the communication system 75 can function utilizing a wireline communication channel such as a local area network (LAN) or a wide area network (WAN) or a combination of both. The LAN, for example, can employ any one of a number of networking protocols, such as TCP/IP (Transmission Control Protocol/Internet Protocol), AppleTalk™, IPX/SPX (Inter-Packet Exchange/Sequential Packet Exchange), Net BIOS (Network Basic Input Output System) or any other packet structures to enable the communication among the devices and/or between the devices and the shared resources. The WAN, for example, can use a physical network media such as X.25, Frame Relay, ISDN, Modem dial-up or other media to connect devices or other local area networks. In the following description, the term "communication system" refers to any of the systems mentioned above or an equivalent.

The first antenna 15 is coupled to the receiver 25, which employs conventional demodulation techniques for receiving the communication signals transmitted by the communication system 75. Coupled to the receiver 25, is the processor 40 utilizing conventional signal-processing techniques for processing received messages. Preferably, the processor 40 is similar to the MC68328 micro-controller manufactured by Motorola, Inc. of Schaumburg, Ill. It will be appreciated by one of ordinary skill in the art that other similar processors can be utilized for the processor 40, and that additional processors of the same or alternative type can be utilized as required to handle the processing requirements of the processor 40. The processor 40 decodes an address in the demodulated data of the received message, compares the decoded address with one or more addresses 80 stored in an address memory 85 of the memory 45; and when a match is detected, proceeds to process the remaining portion of the received message.

To perform the necessary functions of the wireless communication device 10, the processor 40 is coupled to the memory 45, which preferably includes a random access memory (RAM), a read-only memory (ROM), and an electrically erasable programmable read-only memory (EEPROM) (not shown). The memory 45 includes the address memory 85, a message memory 90, and a browser data memory 95.

Once the processor 40 has processed one or more received messages 100, it stores the decoded message in the message memory 90 of the memory 45. It will be appreciated by one of ordinary skill in the art that the message memory 90, in accordance with the present invention, can be a voicemail box or a group of memory locations in a data storage device. In the following description, the term "message memory" refers to any of the memory means mentioned above or an equivalent.

In a preferred embodiment, the wireless communication device 10 includes the external memory interconnect 50 for operatively connecting a memory storage device 105 to the wireless communication device 10. The external memory interconnect 50 can, for example, comprise a structure for physically engaging external contacts on the memory storage device 105 so that the memory storage device 105 is directly connected to the wireless communication device 10. It will be appreciated by one of ordinary skill in the art that the external memory interconnect 50 can also be a wireless connection such as an infrared, Bluetooth or radio frequency interface. When the external memory interconnect 50 is connected to the memory storage device 105, the wireless communication device 10 can access a plurality of memory information from the memory storage device 105.

The memory storage device 105, for example, can be a subscriber identification module (SIM) card. A SIM card is an electronic device typically including a microprocessor unit and a memory suitable for encapsulating within a small flexible plastic card. The SIM card additionally includes some form of interface for communicating with an external device or system. The SIM card can be used to transfer a variety of information from/to the wireless communication device 10 and/or any other compatible device.

Upon receipt and processing of a message, the processor 40 preferably generates a command signal to the alert circuit 55 as a notification that the message 100 has been received and stored. The alert circuit 55 can include a speaker (not shown) with associated speaker drive circuitry capable of playing melodies and other audible alerts, a vibrator (not shown) with associated vibrator drive circuitry capable of producing a physical vibration, or one or more LEDs (not shown) with associated LED drive circuitry capable of producing a visual alert. It will be appreciated by one of ordinary skill in the art that other similar alerting means as well as any combination of the audible, vibratory, and visual alert outputs described can be used for the alert circuit 55.

Upon receipt and processing of a message, the processor 40 preferably also generates a command signal to the display 60 to generate a visual notification of the receipt and storage of the message. When the display 60 receives the command signal from the processor 40 that the message has been received and stored in the memory 45, a message indication is displayed. The message indication, for example can be the activation of one of a plurality of message icons on the display 60. The display 60 can be, for example, a liquid crystal display utilized to display text and graphics. It will be appreciated by one of ordinary skill in the art that other similar displays such as cathode ray tube displays can be utilized for the display 60.

The wireless communication device 10 preferably further includes the clock 35. The clock 35 provides timing for the processor 40. The clock 35 can include the current time for use in the operation of the wireless communication device 10. The clock 35 also provides a source for timing of feature enhancements such as active and inactive periods of operation or periods of alerting.

In a preferred embodiment, the wireless communication device 10 includes the browser application 70. The browser application 70 can be hard coded or programmed into the wireless communication device 10 during manufacturing, can be programmed over-the-air upon customer subscription, or can be a downloadable application. It will be appreciated that other programming methods can be utilized for programming the browser application 70 into the wireless communication device 10. It will be further appreciated by one of ordinary skill in the art that the browser application 70 can be hardware circuitry within the wireless communication device 10.

The browser application 70 preferably provides functionality for a device user to find and view information available on the Internet 115 via the communication system 75. The browser application 70, for example can be a text-based browser using "point-and-click" graphical manipulations. The browser application can preferably interpret the Hyper Text Markup Language (HTML) tags in downloaded documents and format the displayed data according to a set of standard style rules.

The wireless communication device 10 uses a plurality of browser information 110 stored in the browser data memory 95 and/or stored in the memory storage device 105 to perform functions relating to various Internet web sites. The browser information 110, for example, can include data programmable by the device user, such as when the browser application 70 will launch and connect to the Internet 115. For example, the device user can program the browser information 110 to launch the browser application 70 at a predetermined time.

The browser information 110 can, for example, include the connection type (wide area network, short range wireless, infrared data association (IrDA), Universal Serial Bus (USB), or serial). If a wide or local area network was used for communication, the browser information 110 can further include routing information that can be converted to an IPv4/MAC or IPv6 address. A user friendly name, such as a URL, a Uniform Resource Identifier (URI), a phone number or a Domain Name Server (DNS) address can be used to access a database to obtain the routing information (IP addressing).

It will be appreciated by one of ordinary skill in the art that wireless communication devices having software-programming capabilities can include specialized and personalized display options and screens for use with the browser application 70. Alternatively, wireless communication devices that do not include software-programming capabilities can include standard, pre-defined display options and screens for use with the browser application 70.

The browser application 70 further operates using various alert options. In one embodiment, the browser application 70 notifies the processor 40 to send a command to the alert circuit 55 when new browser information 110 is added to the browser data memory 95 or when the current time is an event time or within a predetermined window of an event time relating to a browser application function. Alternatively, no alert can be sent when new browser information is received and stored in the browser data memory 95 and/or when the current time is an event time. It will be appreciated by one of ordinary skill in the art that other alerting schemes are within the scope of the present invention.

Preferably, the user interface 65 is coupled to the processor 40. The user interface 65 can be one or more buttons used to generate a button press, a series of button presses, a voice response from the device user, or some other similar method of manual response initiated by the device user of the wireless communication device 10. The processor 40, in response to receiving a user input via the user interface 65, such as a device user depressing a button or series of buttons, or in response to receipt of a message, initiates a user input signal to the browser application 70. The browser application 70, in response to the user input signal, accesses the browser information 110 in the browser data memory 95 for use in operation of the browser application 70.

The transmitter 30 is coupled to the processor 40 and is responsive to commands from the processor 40. When the transmitter 30 receives a command from the processor 40, the transmitter 30 sends a signal via the second antenna 20 to the communication system 75.

In an alternative embodiment (not shown), the wireless communication device 10 includes one antenna performing the functionality of the first antenna 15 and the second antenna 20. Further, the wireless communication device 10 alternatively includes a transceiver circuit (not shown) performing the functionality of the receiver 25 and the transmitter 30. It will be appreciated by one of ordinary skill in the art that other similar electronic block diagrams of the same or alternate type can be utilized for the wireless communication device 10.

Figure 2:
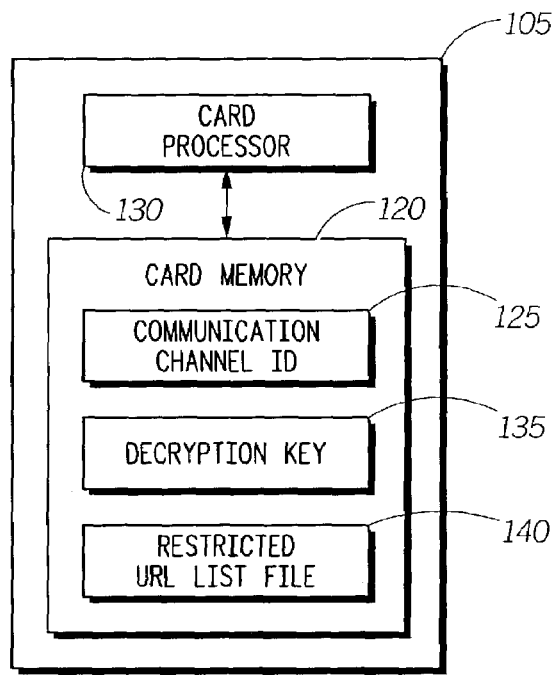
FIG. 2 is an electronic block diagram of a memory storage device for use with the wireless communication device of FIG. 1 in accordance with a preferred embodiment of the present invention.

FIG. 2 is an electronic block diagram of the memory storage device 105 for use with the wireless communication device 10 of FIG. 1 in accordance with a preferred embodiment of the present invention. Preferably, the memory storage device 105 is a SIM card tat is programmed with various information tiles as per GSM 11.11 or 3 GPP 31.101 specifications. The memory storage device 105, for example, includes a card processor 130 and a card memory 120. Within the card memory 120, a plurality of information can be stored, including an identification of communication channel 125 for receipt of messages by the connected wireless communication device and a decryption key 135 for security purposes. In accordance with the present invention, a restricted URL list file 140 is stored within the card memory 120. This file will contain the list of URLs that need to be restricted for access. In one embodiment, the restricted URL list file 140 can be written to and/or modified using an authorized pin number. In this embodiment, only an authorized individual with access to the pin number can modify the list of the restricted access URLs on the memory storage device 105. In another embodiment the restricted URL list file 140 can be written to and/or modified using a message received from the communication system 75. For example, the wireless communication device 10 in which the memory storage device 105 is connected can receive a message that includes an update to the restricted URL list file 140, and in response, the processor 40 can send a command to the memory storage device 105 via the external memory interconnect 50 to update the restricted URL list file 140. Alternatively, the memory storage device 105 can include a transceiver (not shown) for communicating directly with the communication system 75. It will be appreciated by those of ordinary skill in the art that restricted access ranges from total barring of access to minimal restriction of access by the browser application 70 of the connected wireless communication device 10. Restriction, for example, can include customized blocking of Internet websites, instant messaging, newsgroups, FTP, and IRC. In one embodiment, restricted access can be based on categories such as illegal activity/drugs, hate/intolerance, cults, gambling, and the like.

Figure 3:
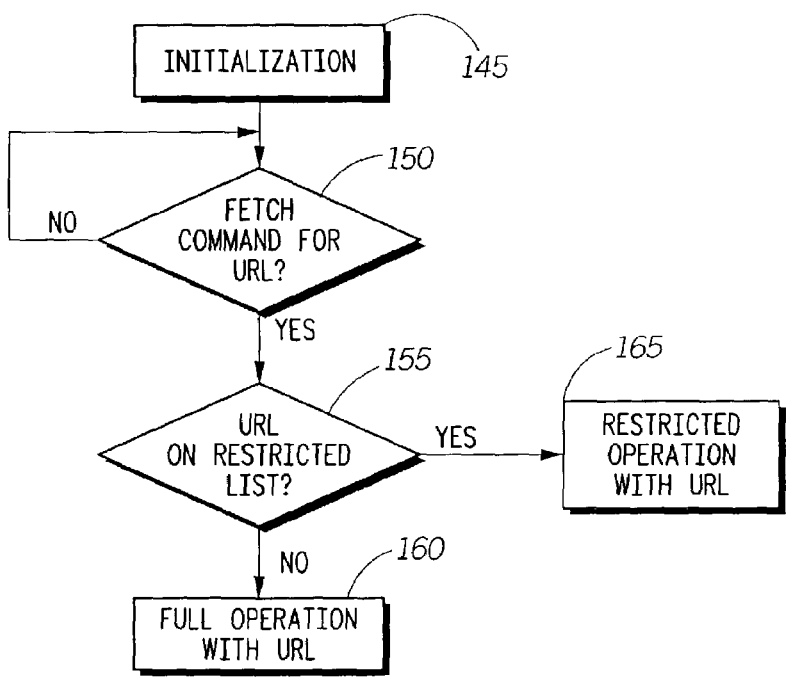
FIG. 3 is a flowchart illustrating the operation of the wireless communication device of FIG. 1 using the memory storage device of FIG. 2 in accordance with a preferred embodiment of the present invention.

FIG. 3 is a flowchart illustrating the operation of the wireless communication device 10 using the memory storage device 105 in accordance with a preferred embodiment of the present invention Specifically, FIG. 3 illustrates the operation of the browser application 70 utilizing the restricted URL list file 140 stored in the memory storage device 105. The process begins in Step 145 in which the restricted URL list file 140 is initialized at power up of the memory storage device 105. Next, in Step 150, the process determines whether a fetch command has been received for a new URL. For example, the browser application 70 can request the processor 40 to initiate a fetch command through the external memory interconnect 50 to the memory storage device 105 in response to a user input to the user interface 65. The fetch command can be received and processed by the card processor 130 of the memory storage device 105.

When no fetch command has been received in Step 150, the process cycles back and continues periodically checking for a command. In Step 155, when a fetch command has been received in Step 150, the card processor 130 next compares the URL contained in the fetch command to a plurality of restricted URLs contained within the restricted URL list file 140. In an alternative embodiment the browser application 70 of the wireless communication device 10 can compare the URL contained in the fetch command to the restricted URL list file 140. In this embodiment, the processor 40 retrieves the restricted URL list file 140 and preferably stores the restricted URL list file 140 in the browser data memory 95. The browser application 70 can then compare the desired URL to the list of URLs in the restricted URL list file 140. In Step 160, when the URL in the fetch command is not contained within the restricted URL list file 140, the browser application 70 operates using the URL in full operation and access. In Step 165, when the URL in the fetch command is contained within the restricted URL list file 140, the browser application 70 operates using the URL in restricted operation and access when restricted, or is barred from access and operation when indicated as such. Preferably, the device user of the wireless communication device 10 is notified of the restricted or barred access using the display 60. For example, a notification of the restricted access can be displayed as a text notification, an icon notification, a graphic notification, or the like. It will be appreciated by those of ordinary skill in the art that, alternatively, the device user can be notified of the restricted access by an audible or vibratory alert using the alert circuit 55 one benefit of the method as described herein is that the restricted access information being stored on the memory storage device 105 provides transportability of the information among a plurality of wireless communication devices.

Although the invention has been described in terms of preferred embodiments, it will be obvious to those skilled in the art that various alterations and modifications can be made without departing from the invention. Accordingly, it is intended that all such alterations and modifications be considered as within the spirit and scope of the invention as defined by the appended claims.

What is claimed is:

1. A wireless communication device comprising:
   an external memory interconnect for operatively connecting to a memory storage device;
   a processor coupled to the external memory interconnect, wherein the processor is programmed to:
   retrieve a restricted URL list file from the memory storage device via the external memory interconnect; and
   a browser application, coupled to the processor, wherein the browser application is programmed to:
   compare a desired URL to the restricted URL list file, and
   restrict access to the desired URL when the desired URL is contained within the restricted URL list file.

2. A wireless communication device as recited in claim 1 wherein the browser application is further programmed to:
   access the URL for full operation when the desired URL is not contained within the restricted URL list file.

3. A wireless communication device as recited in claim 1 Thither comprising:
   a display coupled to the processor for displaying a notification of the restricted access when the desired URL is contained within the restricted URL.

4. A wireless communication device as recited in claim 1 wherein the processor is further programmed to:
   completely bar access to the desired URL when the desired URL is contained within the restricted URL list file.

5. A wireless communication device as recited in claim 1 wherein the external memory interconnect operatively connects to a subscriber identification module card.

6. A wireless communication device as recited in claim 1 further comprising:
   a browser data memory coupled to the processor and further coupled to the browser application for storing a plurality of browser information, wherein the browser application uses the plurality of browser information to perform functions relating to one or more Internet web sites.

7. A wireless communication device comprising:
   an external memory interconnect for operatively connecting to a memory storage device;
   a processor coupled to the external memory interconnect wherein the processor is programmed to:
   retrieve a restricted URL list file from the memory storage device via the external memory interconnect;
   a browser application coupled to the processor, wherein the browser application is programmed to:
   compare a desired URL to the restricted URL list file, and
   restrict access to the desired URL when the desired URL is contained within the restricted URL list file; and
   a browser data memory coupled to the processor and further coupled to the browser application for storing a plurality of browser information, wherein the browser application uses the plurality of browser information to perform functions relating to one or more Internet web sites;
   wherein the processor is further programmed to store the restricted URL list file in the browser data memory, and further wherein the browser application is further programmed to retrieve the restricted URL list file from the browser data memory for comparing the desired URL to the restricted URL list file.

8. A wireless communication device as recited in claim 1 further comprising:
   a user interface coupled to the processor, wherein the processor is programmed to initiate a user input signal to the browser application in response to receiving a user input via the user interface, and further wherein the browser application is programmed to access the plurality of browser information in the browser data memory in response to the user input signal.

9. A wireless communication device as recited in claim 8 wherein the processor is further programmed to initiate the fetch command in response to receiving the user input via the user interface.

10. A method within a wireless communication device comprising:
    retrieving a restricted URL list file from a memory storage device connected to the wireless communication device;
    comparing a desired URL to the restricted URL list file; and
    restricting access to the desired URL when the desired URL is contained within the restricted URL list file.

11. A method as recited in claim 10, further comprising:
    accessing the URL for full operation when the desired URL is not contained within the restricted URL list file.

12. A method as recited in claim 10, further comprising: displaying a notification of the restricted access when the desired URL is contained within the restricted URL.

13. A method as recited in claim 10, wherein the step of restricting access to the desired URL comprises: completely barring access to the desired URL when the desired URL is contained within the restricted URL list file.

14. A method as recited in claim 10, further comprising: storing the restricted URL list file in a memory; and retrieving the restricted URL list file from the memory prior to the comparing step.

* * * * *